INVENTOR(S)
EDWARD L. SHRIVER
BY Arthur H Fischer
John E Coy
ATTORNEYS

//3,541,439
APPARATUS FOR DETERMINING THE DEFLECTION OF AN ELECTRON BEAM IMPINGING ON A TARGET
Edward L. Shriver, Huntsville, Ala., assignor to the United States of America as represented by the Administrator of the National Aeronautics and Space
Filed July 27, 1967, Ser. No. 656,993
Int. Cl. G01r 27/00
U.S. Cl. 324—71    3 Claims

ABSTRACT OF THE DISCLOSURE

An apparatus for determining an electric field strength by measuring the deflection of an electron beam passing through the electric field, including a generally cross-shaped target on which a thin conductive layer is placed for dividing the beam current in direct ratio to the point of beam impingement from current tapping connections coupled to the four edges of the conductive layer. A plurality of amplifiers for amplifying the currents thus obtained and a recorder for measuring the difference between the amplified currents obtained from diametrically opposed current tapping connections.

BACKGROUND OF THE INVENTION

The invention described herein was made by an employee of the United States Government and may be manufactured and used by or for the Government for governmental purposes without the payment of any royalties thereon or therefor.

This invention relates to electron discharge devices and more particularly to electron beam devices having means for measuring the deflection of the electron beam.

The recent advent of space flight has placed a greater demand on instruments originally designed to operate within the earth's atmosphere because of the hostile environment of interplanetary space. For example, in the area of measurement of electric fields of the order of one volt per meter, the use of conventional field meters of the induction type have proved to be difficult in interplanetary space because of the interaction of energetic photons, energetic charged particles, or plasma with the metallic surfaces of the field meters. Also, problems with bearings and lubricants in the vacuum of space diminish the reliability of conventional field meters.

According to the present invention, it has been found that an electric field meter can be made which has none of the aforementioned shortcomings by employing an electron beam device in which use is made of the linear deflecting effect of an electric field on the electron beam. Instruments in which use is made of the deflecting effect on an electron beam by either electric or magnetic fields are known in the art, but in previous applications of this principle, the deflection was measured by either visually inspecting a phosphorescent screen or by determining by electrical means which elements of a matrix of electron sensitive spots on a surface have been activated. The disadvantage of the visual method is its relative insensitivity since the deflection of an electron beam caused by an electric field of one volt per meter would be very slight. The disadvantage with the method of providing a matrix of electron sensitive spots in increased complexity and difficult manufacturing techniques.

SUMMARY OF THE INVENTION

In accordance with the present invention, accurate determination of the deflection of an electron beam is accomplished by directing the electron beam from an electron gun so as to impinge on a fixed target composed of a non-conductive material on which a uniform resistive material is placed. Current tapping points are provided on diametrically opposite edge portions of the resistive material and as the electron beam impinges the resistive material, the current provided by the incident beam of electrons is divided in direct ratio with the distance from each current tapping point. The currents thus obtained are subtracted giving rise to a difference signal which accurately reflects the position of beam impingement.

Accordingly, it is an object of this invention to provide a device for accurately determining the point of impingement of a beam of electrons upon a surface placed in the path of an electron beam.

Another object of this invention is to provide a device for accurately measuring the deflection of an electron beam.

DESCRIPTION OF THE DRAWINGS

These and other objects of this invention will be apparent from the following description taken in accordance with the accompanying drawings in which:

FIGS. 1 and 2 illustrate the basic principles of the invention. An electron gun 11, comprising a cathode 13 and a plurality of focusing lenses 15, is arranged for producing an electron beam 17 so as to impinge on a target 19. The electron gun 11, which may be similar to those employed in conventional cathode ray tubes, and the target 19 are mounted in an evacuated envelope 21. The electron gun circuit is designed to allow the cathode to operate below ground potential and the last lens 16 of focusing lenses 15 of the electron gun is designed to operate at ground potential. Horizontal deflecting plates 22 and 24 and vertical deflecting plates 26 and 28 respectively coupled to variable voltage sources 30 and 32 are provided for producing an electrical field to deflect the electron beam 17.

Figures 1, 2:
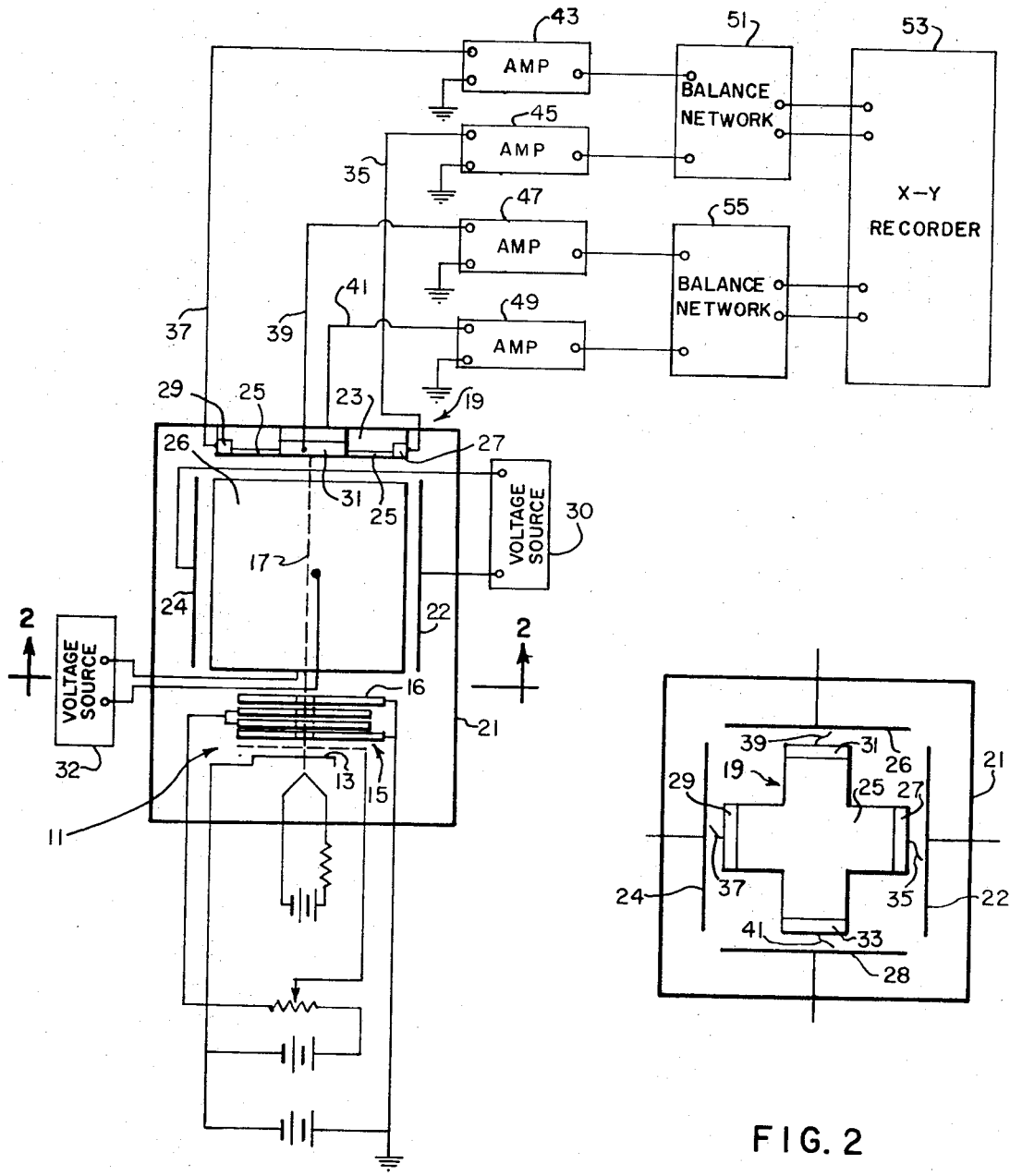
FIG. 1 is a diagrammatic view showing a system embodying the present invention.
FIG. 2 is a sectional view taken along line 2—2 of FIG. 1.

The target 19 as shown in FIGS. 1 and 2 comprises a generally cross-shaped non-conductive material 23 (i.e. as a cermatic material) on which a thin layer of conductive material 25 is placed. The conductive material 25 may comprise a water suspension of colloidal carbon that is sprayed onto the non-conductive portion 23 until a uniform resistance having a relatively high value (i.e. 200,000 ohms) is measured between opposing edges of the conductive material.

Horizontal conducting plates 27 and 29 are mounted in parallel relationship on the non-conductive material 23 and in conducting relationship to the conductive material 23 by suitable bonding means, such as epoxy glue, so as to provide for current tapping in the horizontal or X direction. Vertical conducting plates 31 and 33 are similarly mounted in parallel relationship on the non-conductive material 23 and in conducting relationship to the conductive material 25 so as to provide for current tapping in the vertical or Y direction.

In operation, the conductive material 25 is utilized to divide the current provided by the incident beam of electrons 17 in direct ratio with the distance from each conducting plate to the area of beam impingement. Because the vertical and horizontal conducting plates are arranged at right angles to each other the current flowing out to the plates may be used to determine the position of area of impingement with respect to the conducting plates by comparing the individual current flowing to the horizontal conducting plates 27 and 29 and to the vertical conducting plates 31 and 33. It will also be recognized that because of the generally cross-shaped configuration of the target 19 the resistance between adjoining horizontal and vertical conducting plates is held at a maximum, thus, ensuring that one of the conducting plates does not replace the conductive material 23 as the current divider for the beam current.

To determine the difference in current flowing to the horizontal conducting plates and the vertical conducting plates, leads 35 and 37 are respectively coupled to horizontal plates 27 and 29 while leads 39 and 41 are respectively coupled to vertical plates 31 and 33. As shown in FIG. 1, leads 35, 37, 39, and 41 extend through the envelope 21 and together with the common ground form the respective inputs to DC amplifiers 43, 45, 47, and 49. It is noted that with the last lens 16 of the electron gun 11 at ground potential as previously described, and with the target 19 grounded through the DC amplifiers, the electron beam 17 will be in an electrically field-free region absent an externally applied electric field.

Amplifiers 43 and 45 as shown have their respective outputs coupled to the balancing network 51 while amplifiers 47 and 49 have their respective outputs coupled to the balancing network 55. In a manner to be more fully explained hereinafter balancing networks 51 and 55 may consist of balancing voltage dividers for adjusting the outputs of the amplifiers relative to one another to arrive at a null sensing point. The outputs of the balancing networks 51 and 55 are respectively applied to the X and Y coordinate input terminals of a conventional X-Y recorder 53 to subtract and record the differences between the two signals applied to the X terminal and the two signals applied to the Y terminals.

In operation, upon energization of the electron gun 11, the electron beam 17 is directed toward the center of the target 19 so that the resistance between opposing plates 27 and 29 and plates 31 and 33 divides the current provided by the incident beam of electrons in direct ratio with the distance from each plate. As previously noted, since the last lens of the focusing lenses 15 and the target plate 19 are grounded through the DC amplifiers, no internal electrical field will be produced by the electron gun.

To arrive at a null sensing point the variable voltage sources 30 and 32 are adjusted so that a zero potential is applied across the horizontal deflecting plates 22 and 24 and across the vertical deflecting plates 26 and 28. The balancing networks 51 and 55, consisting of balancing voltage dividers, are then adjusted so that the signals applied to the X terminals of recorder 53 are of equal amplitude and the signals applied to the Y terminals of the recorder are of equal amplitude. Balancing networks 51 and 55 thus eliminate the need for delicate aiming of the electron gun to the exact center of the target 19.

When a voltage is applied across the vertical deflecting plates 26 and 28 and across the horizontal deflecting plates 22 and 24, the electron beam 17 will be deflected in accordance with the applied electrical field, thus resulting in a change in the area of impingement on the target. The resistance between opposing plates 27 and 29 and plates 31 and 33 divides the current provided by the incident beam of electrons in direct ratio with the distance from each conductor. If the beam deflects to the right of its null position, the resistance between the beam and plate 27 becomes less and more current flows in lead 35. At the same time the resistance between the beam's points of contact on the target and plate 29 would be increased, thus reducing the current in lead 37. The increase in current in lead 35 and the decrease in current in lead 37 are respectively amplified by amplifiers 43 and 45 and the resulting signals are applied to the X terminals of the recorder 53 to determine and record the difference. The same circumstances and theory of operation holds true in the vertical plane, giving a reading on the Y axis of the recorder 53 according to the deflection of the beam relative to the plate in the vertical direction.

While the invention as described is embodied in a device responsive to an electric field produced by deflecting plates 22, 24, 26, and 28, it will be apparent that in application in outer space these deflecting plates would be removed together with the envelope 21. Thus, in outer space the vacuum of space would provide the evacuated chamber for the electron gun and the electron beam would be deflected in accordance with the electrical field existing at the location of the instrument.

While the invention as described is embodied in a device responsive to electric field, it will be apparent to those skilled in the art that the device is not limited to such application but may be used wherever an instrument is desired to measure the deflection of or to determine the area of impingement of an electron beam. The output current on the horizontal lead 35 and 37 and on the vertical leads 39 and 41 is proportional to the deflection of the beam about the X and Y axis regardless of whether this is accomplished in response to an electric field or some other condition.

What is claimed is:

1. An apparatus for determining the deflection of an electron beam impinging on a target comprising:
   an evacuated envelope having a target at one end thereof, said target including a conductive surface portion having a pair of horizontal edge portions and a pair of vertical edge portions, wherein said horizontal edge portions and said vertical edge portions are so arranged relative to each other that a line connecting said horizontal edge portions intersects a line connecting said vertical edge portions so that said lines constitute the axis of a coordinate system;
   horizontal current tapping means directly connected to each of said horizontal edge portions and vertical current tapping means directly connected to each of said vertical edge portions;
   an electron beam source positioned in said envelope opposite said target for directing a beam of electrons to impinge upon a portion of said conductive surface, said beam being deflectable from a null position in response to a condition to impinge upon a different portion of said conductive surface thereby varying the current received individually by each of said horizontal and vertical current tapping means; and
   means connected to said horizontal current tapping means and to said vertical current tapping means for indicating the difference between the current flowing respectfully through each of said horizontal current tapping means and through each of said vertical tapping means caused by the deflection of said beam from said null position.

2. The apparatus as claimed in claim 1, wherein said last named means includes a first pair of amplifiers, each of said first pair of amplifiers being connected to one of said horizontal current tapping means, a second pair of amplifiers, each of said second pair of amplifiers being connected to one of said vertical current tapping means;
   a first voltage balancing circuit connected to each of said first pair of amplifiers for balancing the outputs of said first pair of amplifiers when the electron beam is in said null position;
   a second voltage balancing circuit connected to each of said second pair of ampliers for balancing the outputs of said second pair of amplifiers when the electron beam is in said null position; and
   voltage indicating means connected to said first and second voltage balancing circuits for indicating the difference in output voltage between said first pair of amplifiers and for indicating the difference in output voltage between said second pair of amplifiers.

3. The apparatus as claimed in claim 1, said conductive surface forming a cross-shape having vertical and horizontal legs, and said horizontal and vertical current tapping means comprise conductive plates respectively continuous with edges of said vertical and horizontal legs.

References Cited

UNITED STATES PATENTS

| | | | |
|---|---|---|---|
| 2,599,944 | 6/1962 | Salisbury | 343—18 X |
| 2,810,859 | 10/1957 | Ross | 315—21 |
| 3,098,998 | 7/1963 | Smith. | |
| 3,207,902 | 9/1965 | Sandborg | 250—83.1 |
| 2,515,057 | 7/1950 | Pierce | 315—10 X |
| 2,877,284 | 3/1959 | Schultz. | |

OTHER REFERENCES

Bradshaw, R. D. and Jensen, H. H.: Electrographic Data Sensing, IBM Technical Disclosure Bulletin, vol. 9, No. 1, June 1966, pp. 35–36.

EDWARD E. KUBASIEWICZ, Primary Examiner

U.S. Cl. X.R.

250—83.1; 324—44